US012590543B1

(12) United States Patent
Durocher

(10) Patent No.: US 12,590,543 B1
(45) Date of Patent: Mar. 31, 2026

(54) GAS TURBINE ENGINE WITH SHAFT RETENTION SYSTEM

(71) Applicant: Pratt & Whitney Canada Corp., Longueuil (CA)

(72) Inventor: Eric S. Durocher, Boucherville (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 19/097,345

(22) Filed: Apr. 1, 2025

(51) Int. Cl.
*F01D 5/02* (2006.01)

(52) U.S. Cl.
CPC .......... *F01D 5/026* (2013.01); *F05D 2240/60* (2013.01); *F05D 2260/31* (2013.01); *F05D 2260/38* (2013.01)

(58) Field of Classification Search
CPC .. F01D 5/026; F05D 2240/60; F05D 2260/31; F05D 2260/38
See application file for complete search history.

(56) References Cited

U.S. PATENT DOCUMENTS

| | | | | |
|---|---|---|---|---|
| 3,631,688 | A | 1/1972 | Quick | |
| 3,958,887 | A | 5/1976 | Bracey | |
| 7,704,029 | B2 * | 4/2010 | Blais | F16D 1/076 411/533 |
| 9,022,741 | B2 | 5/2015 | Houradou | |
| 9,574,600 | B2 * | 2/2017 | Lagarde | F16B 39/10 |
| 9,745,865 | B2 * | 8/2017 | Lefebvre | F01D 17/02 |
| 11,933,230 | B2 | 3/2024 | Levisse | |

* cited by examiner

*Primary Examiner* — Michael L Sehn
(74) *Attorney, Agent, or Firm* — Getz Balich LLC

(57) ABSTRACT

A gas turbine engine is provided that includes a compressor section, a combustor, a turbine section, an engine shaft, a shaft retention system, and an axial centerline. The engine shaft is engaged with the compressor section and the turbine section. The engine shaft has an aft end and axially extends along the axial centerline of the engine. The shaft retention system includes a shaft nut and a shaft retainer. The shaft nut is attached to the aft end of the engine shaft. The shaft retainer is mounted for axial translation normal to the axial centerline. The shaft retainer is disposable in an engaged configuration wherein the shaft retainer is coupled with the shaft nut, and in a disengaged configuration wherein the shaft retainer is disengaged with the shaft nut.

20 Claims, 13 Drawing Sheets

GAS TURBINE ENGINE WITH SHAFT RETENTION SYSTEM

BACKGROUND OF THE INVENTION

1. Technical Field

The present disclosure relates to gas turbine engines in general, and to gas turbine engine shaft retention systems in particular.

2. Background Information

The term "hot section removal" refers to the process of taking apart and removing the hottest components of a gas turbine engine, typically including the combustion chamber, turbine blades, and associated housing, for inspection, maintenance, or repair during a "hot section inspection" procedure, where the parts are carefully examined to determine if repair or replacement is necessary. In some instances it is possible to perform a hot section removal while the engine is still mounted on the aircraft. During the hot section removal, however, physical damage to engine components can occur. It would be very useful to have an engine configured to facilitate hot section removal in a manner that decreases the potential for engine component damage.

SUMMARY

According to an aspect of the present disclosure, a gas turbine engine is provided that includes a compressor section, a combustor, a turbine section, an engine shaft, a shaft retention system, and an axial centerline. The engine shaft is engaged with the compressor section and the turbine section. The engine shaft has an aft end and axially extends along the axial centerline of the engine. The shaft retention system includes a shaft nut and a shaft retainer. The shaft nut is attached to the aft end of the engine shaft. The shaft retainer is mounted for axial translation normal to the axial centerline. The shaft retainer is disposable in an engaged configuration wherein the shaft retainer is coupled with the shaft nut, and in a disengaged configuration wherein the shaft retainer is disengaged with the shaft nut.

In any of the aspects or embodiments described above and herein, the shaft retainer may include a first mechanical feature and the shaft nut may include a second mechanical feature. In the engaged configuration, the first mechanical feature and the second mechanical feature may be disposed in a mating configuration that axially secures the engine shaft.

In any of the aspects or embodiments described above and herein, the shaft retainer may include a post extending outwardly from an engagement segment, and the first mechanical feature may be disposed in the engagement segment.

In any of the aspects or embodiments described above and herein, the first mechanical feature may be a slot disposed in the engagement segment.

In any of the aspects or embodiments described above and herein, the engagement segment (ES) may be curved at a radius and may have an ES inner radial surface and the slot may be disposed in the ES inner radial surface.

In any of the aspects or embodiments described above and herein, the second mechanical feature may be a flange that extends radially outward from an outer perimeter surface of the shaft nut, and the flange may be configured to be received within the slot.

In any of the aspects or embodiments described above and herein, the shaft retention system may include a bearing housing configured to support the shaft retainer.

In any of the aspects or embodiments described above and herein, the bearing housing may include an end wall and a side wall. The end wall and the side wall may collectively define an interior cavity of the bearing housing.

In any of the aspects or embodiments described above and herein, the side wall may have a first side wall segment that includes an aperture configured to receive the post of the shaft retainer.

In any of the aspects or embodiments described above and herein, the shaft nut may be disposed within the interior cavity of the bearing housing.

In any of the aspects or embodiments described above and herein, the first side wall segment (FSWS) may have an inner radial surface and a FSWS slot disposed in the inner radial surface. The aperture may be aligned with the FSWS slot.

In any of the aspects or embodiments described above and herein, the FSWS slot may be configured to receive the engagement segment of the shaft retainer.

In any of the aspects or embodiments described above and herein, the shaft retainer may be normally biased in the disengaged configuration.

In any of the aspects or embodiments described above and herein, the shaft retention system may include a shaft retainer spring that normally biases the shaft retainer in the disengaged configuration.

In any of the aspects or embodiments described above and herein, the shaft retainer spring may be a coil spring that acts between the post of the shaft retainer and the first side wall segment.

In any of the aspects or embodiments described above and herein, the side wall may have a first side wall segment that includes an aperture configured to receive the post of the shaft retainer. The aperture may be configured to allow axial translation of the post in a direction that is perpendicular to the axial centerline.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. The following description and drawings are intended to be exemplary in nature and non-limiting.

DETAILED DESCRIPTION

Figure 1:
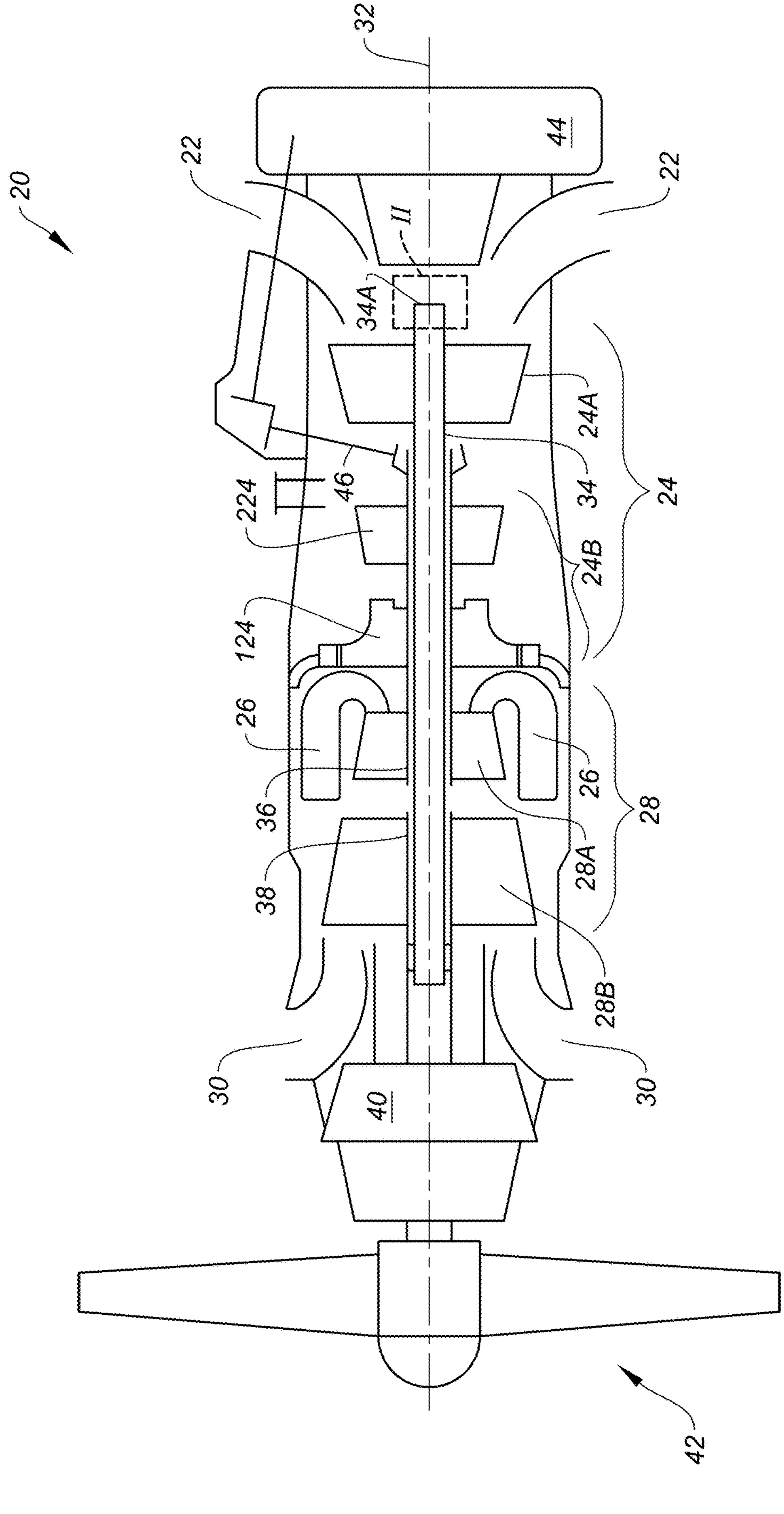
FIG. 1 is a diagrammatic illustration of a gas turbine engine that may utilize embodiments of the present disclosure.

FIG. 1 diagrammatically illustrates a thermal engine in the form of a gas turbine engine 20 that includes an air inlet 22, a compressor section 24, a combustor 26, a turbine section 28, and an exhaust outlet 30 disposed on an axial centerline 32. The compressor section 24 includes a low pressure compressor (LPC 24A) and a high pressure compressor (HPC 24B). In the engine 20 embodiment shown in FIG. 1, the HPC 24B includes a centrifugal compressor stage 124 and an axial compressor stage 224. The turbine section 28 includes a high pressure turbine (HPT 28A) and a low pressure turbine (LPT 28B). A low pressure shaft 34 connects the LPT 28B to the LPC 24A. A high pressure shaft 36 connects the HPT 28A to the HPC 24B. An output driveshaft 38 is engaged with the low pressure shaft 34 and with a reduction gear box (RGB 40). FIG. 1 diagrammatically illustrates the engagement between the output shaft 38 and the low pressure shaft 34 in the form of a spline arrangement; e.g., the low pressure shaft 34 is diagrammatically shown received within the output driveshaft 38 with the spline arrangement therebetween. The present disclosure is not limited to this shaft arrangement; e.g., a geared arrangement may be utilized in addition to or in place of the spline arrangement to alter the relative rotational speeds of the low pressure shaft 34 and the output shaft 38. The present disclosure is not limited to a spline arrangement, a geared arrangement, or any particular engagement configuration between the low pressure shaft 34 and the output driveshaft 38. The RGB 40 is engaged with a propulsion unit 42; e.g., via a propeller shaft. In this example, the propulsion unit 42 includes a propeller. The present disclosure is not limited to use with propeller type propulsion units 42. In other embodiments, the propulsion unit 42 may include rotors (e.g., a helicopter or a tilt rotor aircraft), or the like. The RGB 40 permits the propulsion unit 42 to be driven at a rotational speed that is different (e.g., slower) than the rotational speed of the LPT 28B/LPC 24A.

The gas turbine engine 20 embodiment shown in FIG. 1 also includes an auxiliary gear box (AGB 44) that is driven off of the high pressure shaft 36 by a tower shaft 46 coupled with an AGB drive shaft. The present disclosure does not require a gas turbine engine 20 coupled with an AGB 44.

The gas turbine engine 20 example shown in FIG. 1 is a reverse-flow engine with its air inlet 22 disposed at the opposite of the engine 20 from the propulsion unit 42. In terms of axial positioning along the axial centerline 32, the engine components are disposed in the following order from the forward end of the engine to the aft end of the engine: the propulsion unit 42, the RGB 40, the exhaust outlet 30, the LPT 28B, the HPT 28A and combustor 26, the HPC 24B, the LPC 24A, the air inlet 22, and the AGB 44. The combustor 26 is disposed radially outside of the HPT 28A.

Air enters the engine 20 through the air inlet 22, passes through the LPC 24A and the HPC 24B, passes into the combustor 26 where it is mixed with fuel and combusted. Any non-combusted air and the gaseous combustion byproducts (collectively referred to as "core gas") are passed into the HPT 28A, and subsequently into the LPT 28B before exiting the engine 20 via the exhaust outlet 30. The core gas provides motive power to the HPT 28A and the LPT 28B. The HPT 28A drives the high pressure shaft 36 which in turn drives the HPC 24B; e.g., including the axial compressor stage 224 and the centrifugal compressor stage 124. The LPT 28B drives the low pressure shaft 34 which in turn drives the output drive shaft 38 and the propulsion unit 42. To facilitate the description herein, the terms "downstream" and "upstream" may be used to refer to engine component positioning relative to the direction of air/core gas passing through the engine 20. For example, the compressor section 24 is upstream of the combustor 26 and the turbine section 28 is downstream of the combustor 26. The present disclosure is not limited to the particular gas turbine engine 20 configuration diagrammatically shown in FIG. 1.

Figure 2:
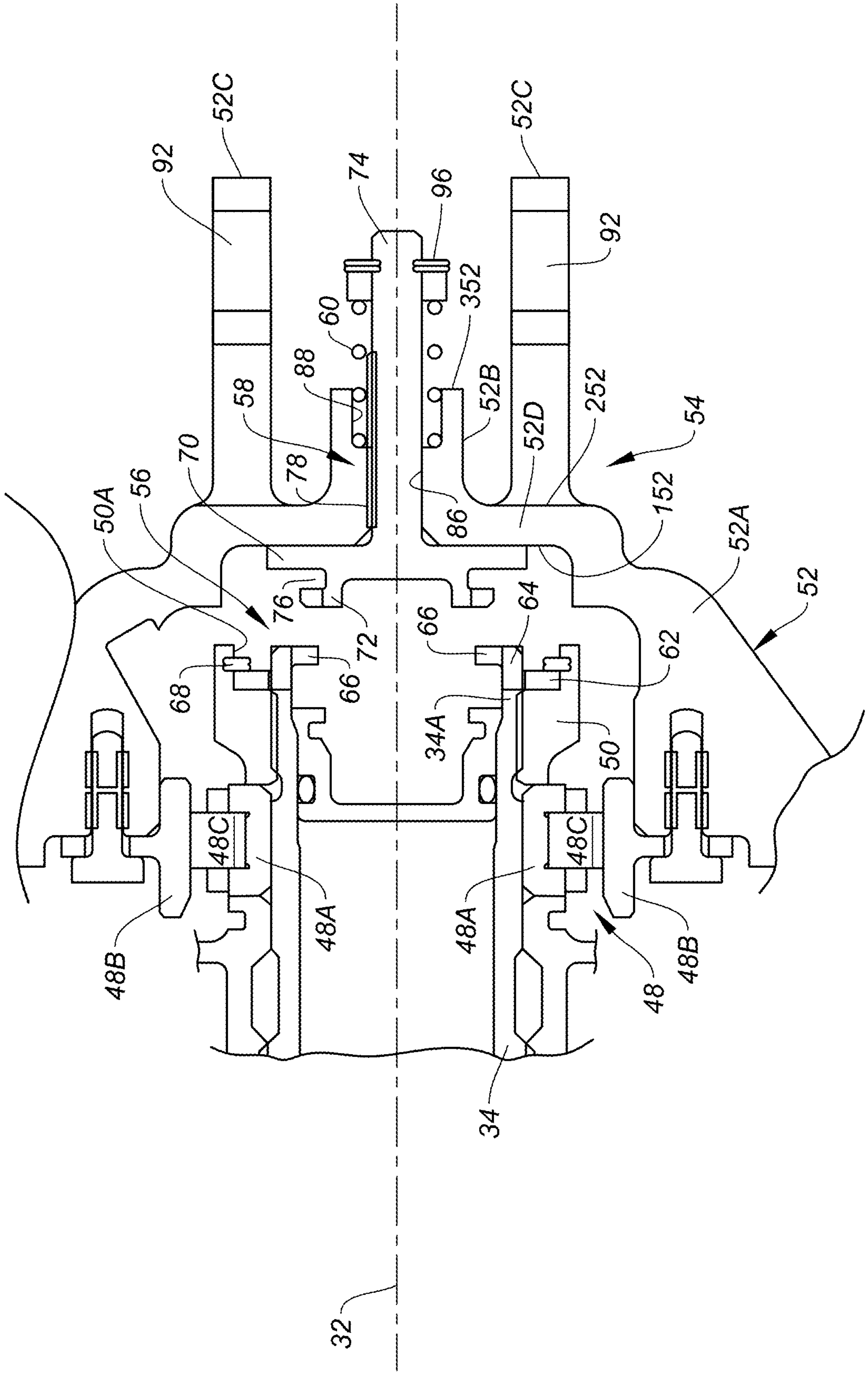
FIG. 2 is a diagrammatic enlarged view of a portion of the engine at the aft end of a low pressure shaft of a gas turbine engine, illustrating an embodiment of the present disclosure shaft retention system disposed in a disengaged configuration.

FIG. 2 is a diagrammatic enlarged view of a portion of an engine 20 embodiment at the aft end 34A of the low pressure shaft 34. FIG. 1 includes a dashed box (labeled "II") to indicate the location of the engine 20 portion diagrammatically illustrated in FIG. 2. As can be seen in FIG. 2, a bearing 48 may be disposed to rotationally support the low pressure shaft 34. The bearing 48 may include an inner race 48A, an outer race 48B, and roller elements 48C. The inner race 48A is engaged with the low pressure shaft 34 and the roller elements 48C are disposed between the inner and outer races 48A, 48B. The present disclosure is not limited to this particular bearing 48 arrangement. A shaft nut 50 is engaged with the aft end 34A of the low pressure shaft 34 and the inner race 48A of the bearing 48. A bearing housing 52 described hereinafter is coupled (e.g., via mechanical fasteners) with the outer race 48B of the bearing 48.

Aspects of the present disclosure include a shaft retention system 54 that may be used to retain the low pressure shaft 34 to facilitate inspection and/or repair of the engine 20, and/or engine 20 assembly, or the like.

FIG. 2 diagrammatically illustrates a shaft retention system 54 embodiment that includes a shaft retainer cap 56, a retainer piston 58, and a bearing housing 52. In some embodiments, the shaft retention system 54 may include a piston spring 60. As will be detailed herein, present disclosure shaft retention system 54 embodiments employ the retainer piston 58 to mechanically engage with the shaft retainer cap 56 to retain the low pressure shaft 34 and prevent any appreciable axial travel of the low pressure shaft 34.

Figure 3A:
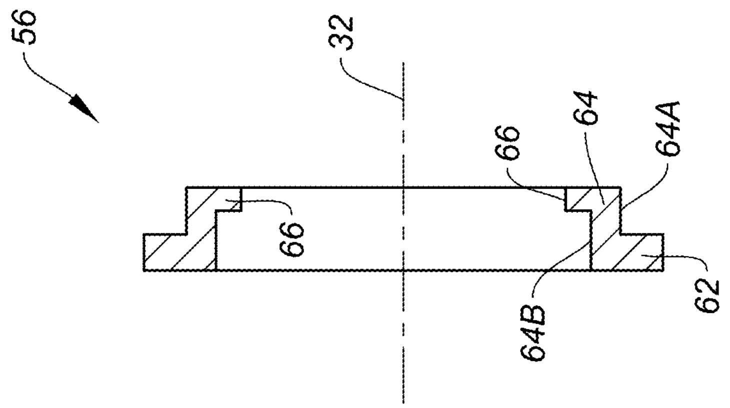
FIG. 3A is a sectional view of the shaft retainer cap embodiment shown in FIG. 3 along the sectional line 3A-3A shown in FIG. 3.
Figure 3:
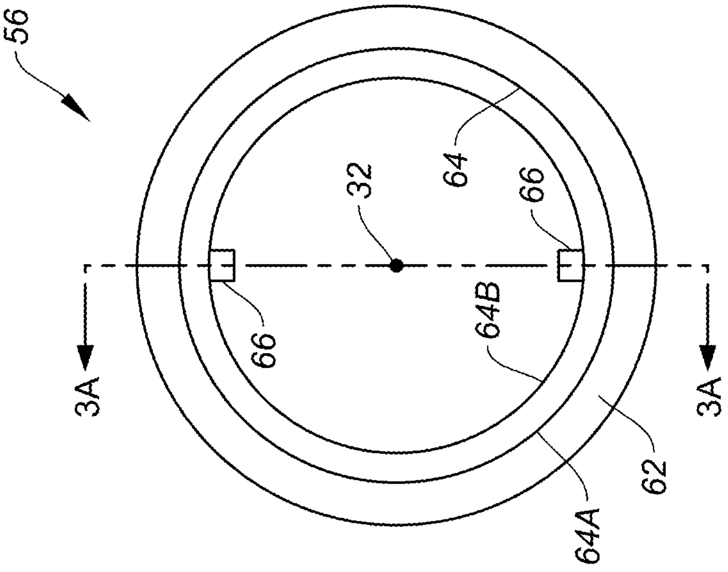
FIG. 3 is a forward view of a shaft retainer cap embodiment.

Referring to FIGS. 2, 3, and 3A, the shaft retainer cap 56 includes an outer radial flange 62, a central segment 64, and at least one lug 66. The outer radial flange 62 extends radially outward from an outer radial surface 64A of the central segment 64 and the at least one lug 66 extends radially inward from an inner radial surface 64B of the central segment 64. In the embodiment diagrammatically shown in FIGS. 2, 3, and 3A, the shaft retainer cap 56 includes a pair of lugs 66 disposed one hundred eighty degrees (180°) apart from one another. In some embodiments, the shaft retainer cap 56 may include more than two lugs 66. The present disclosure is not limited to the configuration of the shaft retainer cap 56 example shown in FIGS. 2 and 3A.

In the shaft retention system 54 embodiment diagrammatically shown in FIGS. 2, 3, and 3A, the shaft retainer cap 56 is configured to be retained with the shaft nut 50. FIG. 2 illustrates the outer radial flange 62 of the shaft retainer cap 56 disposed within a bore 50A disposed in the shaft nut 50. A retention ring 68 (e.g., a snap ring—see FIG. 2) may be used to maintain the outer radial flange 62 of the shaft retainer cap 56 within the shaft nut bore 50A. In some embodiments, the outer radial flange 62 and the shaft nut bore 50A may include mating mechanical features (e.g., a tab and slot, or an asymmetric shape, or the like—not shown) to prevent rotation of the shaft retainer cap 56 relative to the shaft nut 50.

Figure 4A:
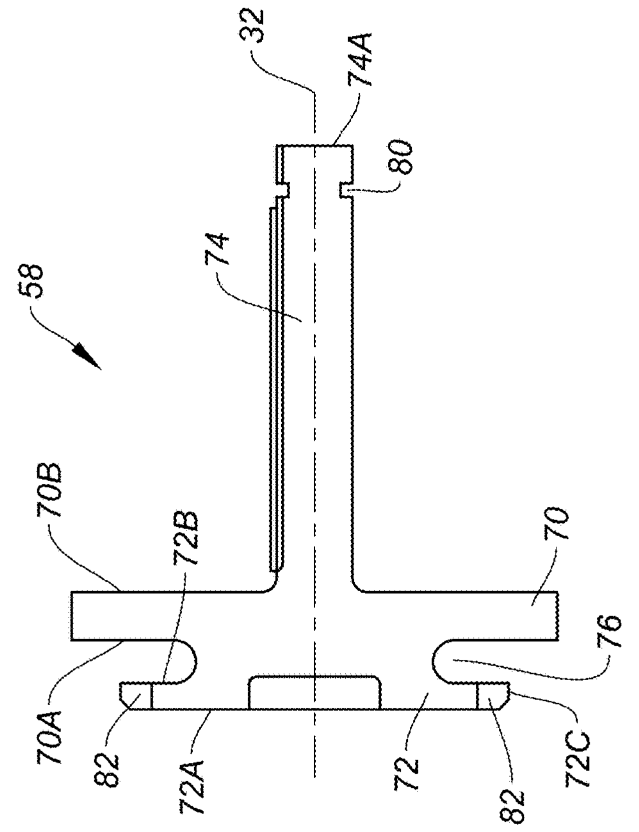
FIG. 4A is a sectional view of the retainer piston embodiment shown in FIG. 4 along the sectional line 4A-4A shown in FIG. 4.
Figure 4:
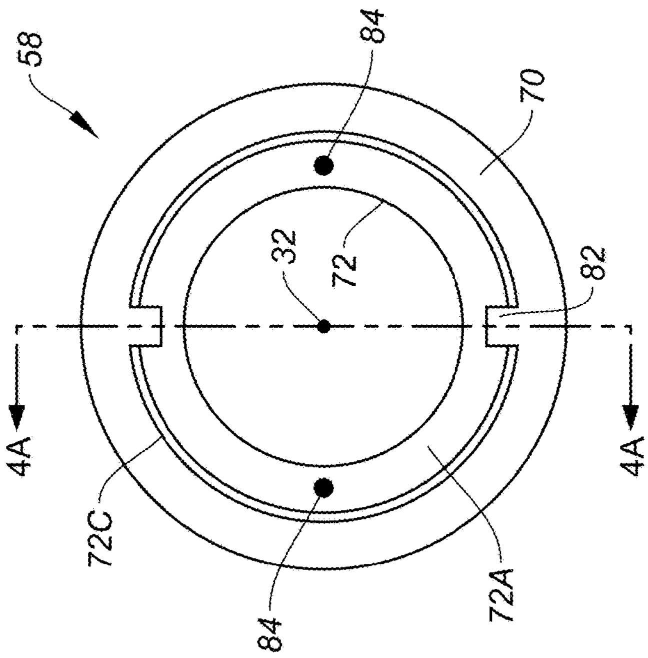
FIG. 4 is an aft view of a retainer piston embodiment.

The retainer piston 58 diagrammatically shown in FIGS. 4 and 4A includes a primary flange 70, a secondary flange 72, and a spring shaft 74. The primary flange 70 (PF) includes a PF forward surface 70A and a PF aft surface 70B. The secondary flange (SF) 72 includes a SF forward surface 72A, a SF aft surface 72B, and a SF outer radial surface 72C extending between the SF forward and SF aft surfaces 72A, 72B. The forward surface 70A of the primary flange 70 and the aft surface 72B of the secondary flange 72 are axially spaced apart from one another, thereby forming an annular channel 76 therebetween. The spring shaft 74 extends axially outward from the aft surface 70B of the primary flange 70 to a spring shaft distal end 74A. In some embodiments, at least a portion of the spring shaft 74 includes a portion of a spline arrangement 78 (e.g., see FIG. 2) for engagement with the bearing housing 52 as will be detailed herein. In some embodiments, the spring shaft 74 may include a retainer channel 80 disposed adjacent the distal end 74A of the spring shaft 74. The secondary flange 72 includes at least as many slots 82 as the number of shaft retainer cap lugs 66; e.g., if the shaft retainer cap 56 includes a single lug 66, the secondary flange includes one or more slots 82. The slot(s) 82 extend radially inward from the outer radial surface 72C of the secondary flange 72 and are configured to receive the lug(s) 66 of the shaft retainer cap 56. In some embodiments, the retainer piston 58 may include one or more rotational limit features 84 configured to limit rotational movement between the retainer piston 58 and the shaft retainer cap 56. A non-limiting example of a rotational limit feature is a pin, a tab, or the like that extends into the annular channel 76 between the primary flange 70 and the secondary flange 72. FIG. 4 illustrates a pair of rotational limit features 84 in the form of pins. The present disclosure is not limited to any particular rotational limit feature 84 configuration and does not require the inclusion of rotational features 84.

Figure 2A:
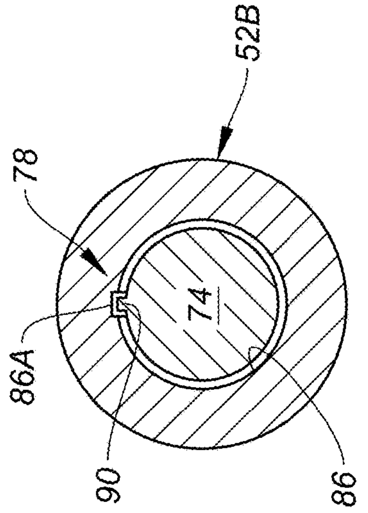
FIG. 2A is a diagrammatic view illustrating the spring shaft received the central bore with a spline arrangement example.

Referring to FIG. 2, the bearing housing 52 includes a bearing enclosure portion 52A, a piston shaft collar 52B, a pair of tool posts 52C, and is disposed about an axial centerline 32. The bearing enclosure portion 52A includes side walls that extend from a forward end to an end plate 52D, collectively forming an interior cavity. The end plate 52D has a forward axial surface 152 and an aft axial surface 252. The piston shaft collar 52B extends axially out from the aft axial surface 252 of the end plate 52D to a collar distal end surface 352. A central bore 86 extends through the piston shaft collar 52B and the end plate 52D. A spring seat bore 88 extends axially inward a distance from the collar distal end surface 352 and is concentric with the central bore 86. In some embodiments, the central bore 86 may include a portion of a spline arrangement 78 (see FIGS. 2 and 2A) for engagement with the spring shaft 74; e.g., the spline arrangement 78 may be a male/female arrangement. For example, the central bore 86 may include a slot 86A (see FIG. 2A) configured to receive a rib 90 attached to the spring shaft 74. The spline arrangement 78 is configured to allow axial movement of the retainer piston 58 relative to the bearing housing 52 and to prevent rotational movement of the retainer piston 58/spring shaft 74 relative to the bearing housing 52. The present disclosure is not limited to any particular spline arrangement; e.g., bearing housing 52/retainer piston 58 configurations that allow relative axial movement and prevent relative rotational movement may be used alternatively. The tool posts 52C extend axially outward from the aft axial surface 252 of the end plate 52D. The tool posts 52C are disposed on opposite sides of the axial centerline 32, spaced apart from the piston shaft collar 52B. Each tool post 52C includes a tool aperture 92 configured to receive an actuating tool 94 (see FIG. 6) configured to cause linear translation of the retainer piston 58. The bearing housing 52 configuration having a pair of tool posts 52C is an example of structure that may be included to facilitate actuation of the retainer piston 58 and the present disclosure is not limited thereto; e.g., a single tool post 52C may be included, or more than two tool posts 52C may be included, or a concentric body (not shown) may be utilized in place of the tool posts 52C, or the like.

Still referring to FIG. 2, the shaft retention system 54 is shown with the spring shaft 74 of the retainer piston 58 received within the central bore 86 of the bearing housing 52. As detailed herein, the engagement between the spring shaft 74 and the central bore 86 may be such that relative movement between the spring shaft 74 and the central bore 86 is limited to axial movement of the spring shaft 74 relative to the central bore 86. As shown in FIG. 2, the shaft retention system 54 includes a piston spring 60 acting between the spring seat bore 88 disposed in the piston shaft collar 52B and a mechanical retainer 96 attached to the spring shaft 74. In the example shown in FIG. 2, the mechanical retainer 96 is a washer and a retainer clip (e.g., a snap ring) that is engaged with the retainer channel 80 (see FIG. 4A) disposed in the spring shaft 74. The present disclosure is not limited to the mechanical retainer 96 shown in FIG. 2; e.g., the mechanical retainer 96 may be a nut threaded onto the spring shaft 74, or a pin or clip extending through the spring shaft 74, or the like. The piston spring 60 acting between the spring seat bore 88 and the mechanical retainer 96 functions to bias the retainer piston 58 in a disengaged configuration. As will be detailed herein, the piston spring 60 may be compressed to permit the retainer piston 58 into an engaged configuration. The term "bias" is used to refer to the spring force (or "biasing force") produced by a spring; e.g., the piston spring 60 that acts between the spring seat bore 88 and the mechanical retainer 96. The piston spring 60 (e.g., a helical spring) has a spring rate that represents the amount of force needed to compress the piston spring 60 a predetermined distance. It is assumed, but not required, that the spring rate is linear. Hence, the biasing force produced by the piston spring 60 is a function of the amount that the piston spring 60 is compressed. In the disengaged configuration, the piston spring 60 may be compressed an amount that enables the piston spring 60 to hold the primary flange 70 of the retainer piston 58 in close proximity or in contact with a predetermined surface such as the forward axial surface 152 of the bearing housing end plate 52D. In this disengaged configuration, the retainer piston 58 is spaced apart from the shaft retainer cap 56 and will not engage with the shaft retainer cap 56 during operation of the gas turbine engine 20. To arrive at the engaged position, the retainer piston 58 is axially translated forward to a position wherein the retainer piston 58 can engage with the shaft retainer cap 56. The forward axial translation of the retainer piston 58 causes the piston spring 60 to compress. Hence, the piston spring 60 biases the retainer piston 58 in an aft axial direction and resists forward axial translation of the retainer piston 58.

Figure 5A:
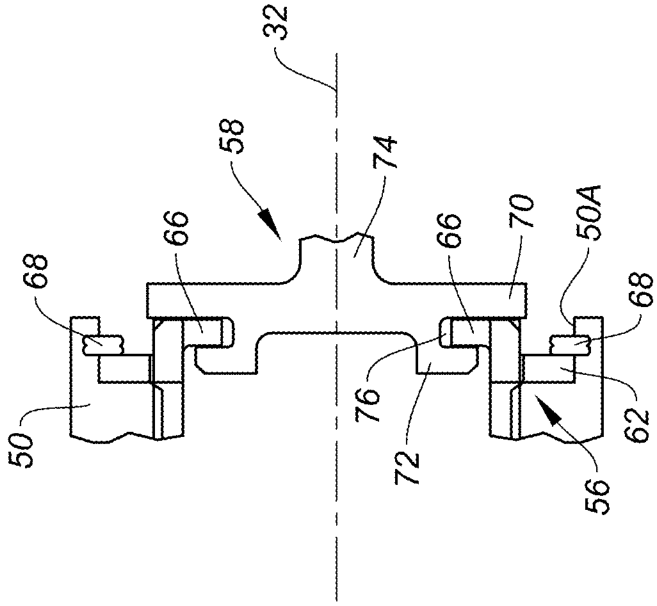
FIG. 5A is a sectional view of the diagrammatic representation of the retainer piston coupled with the shaft retainer cap shown in FIG. 5 along the sectional line 5A-5A shown in FIG. 5.
Figure 5:
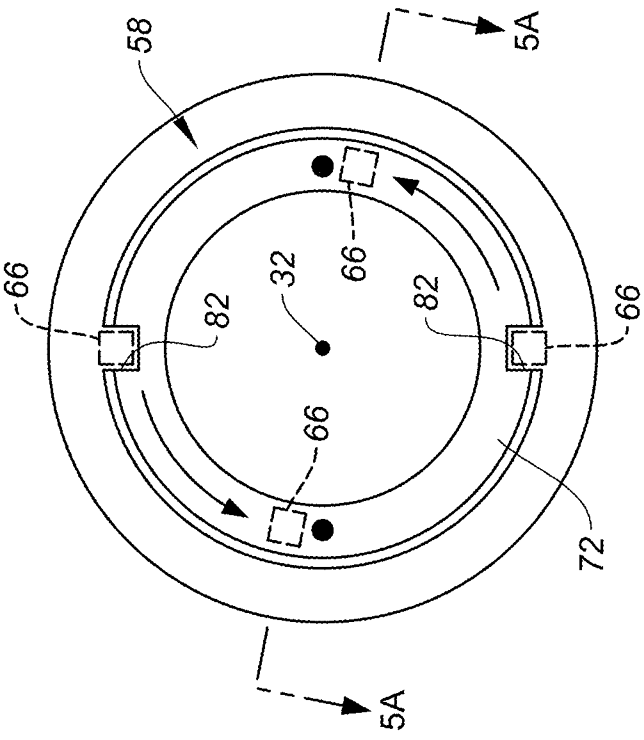
FIG. 5 is a diagrammatic representation of a retainer piston coupled with a shaft retainer cap.

FIGS. 5 and 5A diagrammatically illustrate a pair of lugs 66 of a shaft retainer cap 56 disposed in corresponding slots 82 disposed in a secondary flange 72 of a retainer piston 58. FIG. 5 also diagrammatically illustrates the lugs 66 rotated counterclockwise. FIG. 5A diagrammatically illustrates the lugs 66 extending into the annular channel 76 of the retainer piston 58 disposed between the primary flange 70 and the secondary flange 72; e.g., in a configuration like that diagrammatically shown by the lugs 66 rotated counterclockwise in FIG. 5. In this configuration (i.e., an engaged configuration), the shaft retainer cap 56 and the retainer piston 58 are coupled.

Figure 6:
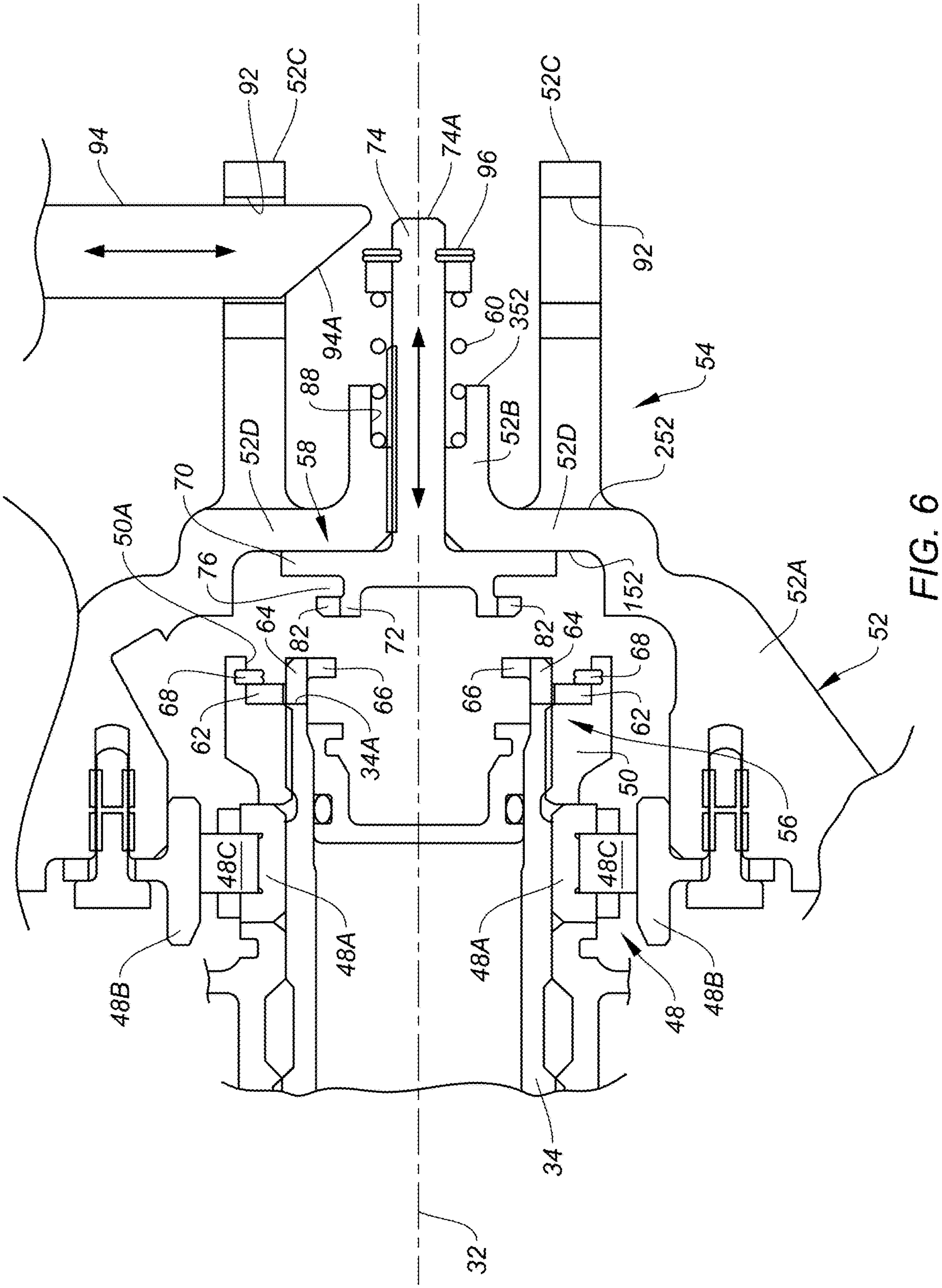
FIG. 6 is a diagrammatic enlarged view of a portion of the engine at the aft end of a low pressure shaft of a gas turbine engine, illustrating an embodiment of the present disclosure shaft retention system disposed in a disengaged configuration and including an actuating tool embodiment partially engaged.

FIG. 6 illustrates a shaft retention system 54 embodiment like that diagrammatically shown in FIG. 2, wherein the shaft retention system 54 is disposed in a disengaged configuration. In the disengaged configuration, the piston spring 60 biases the retainer piston 58 in an aft direction maintaining the retainer piston 58 out of engagement with the shaft retainer cap 56.

During an inspection, maintenance, or repair procedure wherein it is desirable to remove the sections of the engine 20 (e.g., a "hot section removal"), the gas turbine engine 20 is not under power and the low pressure shaft 34 is stationary. As will be detailed herein, the low pressure shaft 34 may be manually rotated, but is not rotated as a result of engine power.

According to aspects of the present disclosure, the shaft retention system 54 may be used to axially secure the low pressure shaft 34, and thereby facilitate the desired inspection, maintenance, or repair procedure.

FIG. 6 diagrammatically illustrates an actuating tool 94 extending into the tool aperture 92 of a first tool post 52C of the bearing housing 52. As shown in FIG. 6, the actuating tool 94 is not engaged with the retainer piston 58, and therefore has not caused axial translation of the retainer piston 58 and/or compression of the piston spring 60.

Insertion of the actuating tool 94 in a direction perpendicular to the axial centerline 32 of the shaft retention system 54 causes the actuating tool 94 to engage the distal end 74A of the spring shaft 74 of the retainer piston 58. The actuating tool 94 shown in FIG. 6 has an angularly disposed cam surface 94A that linearly increases the axial translation of the retainer piston 58. Continued insertion will cause the slot(s) 82 disposed in the secondary flange 72 of the retainer piston 58 to be in a position to receive the lug(s) 66 of the shaft retainer cap 56. The spline arrangement 78 between the central bore 86 of the bearing housing 52 and the spring shaft 74 of the retainer piston 58 allows the retainer piston 58 to translate axially without rotation. The low pressure shaft 34 of the engine 20 can be rotated to align the slot(s) 82 disposed in the secondary flange 72 of the retainer piston 58 with the lug(s) 66 of the shaft retainer cap 56. Once the slot(s) 82 and lug(s) 66 are aligned, the shaft retention system 54 embodiment is disposed in the engaged configuration and the actuating tool 94 can be fully inserted between the tool posts 52C; e.g., see FIG. 7. Subsequently, the low pressure shaft 34 can be rotated so that the lug(s) 66 is disposed within the annular channel 76 disposed between the primary flange 70 and the secondary flange 72 of the shaft retainer cap 56. In those embodiments that include rotational limit features 84, the features 84 will limit the rotation of the low pressure shaft 34 relative to the retainer piston 58 and provide an indication that the low pressure shaft 34 is retained. Once the low pressure shaft 34 is retained, the inspection, maintenance, or repair procedure can be initiated. Once the inspection, maintenance, or repair procedure is completed, the low pressure shaft 34 can be rotated until the lug(s) 66 is once again aligned with the slot 82. As the actuating tool 94 is removed, the piston spring 60 will bias the retainer piston 58 towards the disengaged position. When the actuating tool 94 is completely removed, the retainer piston 58 will be maintained in the disengaged position by the piston spring 60.

Figure 7:
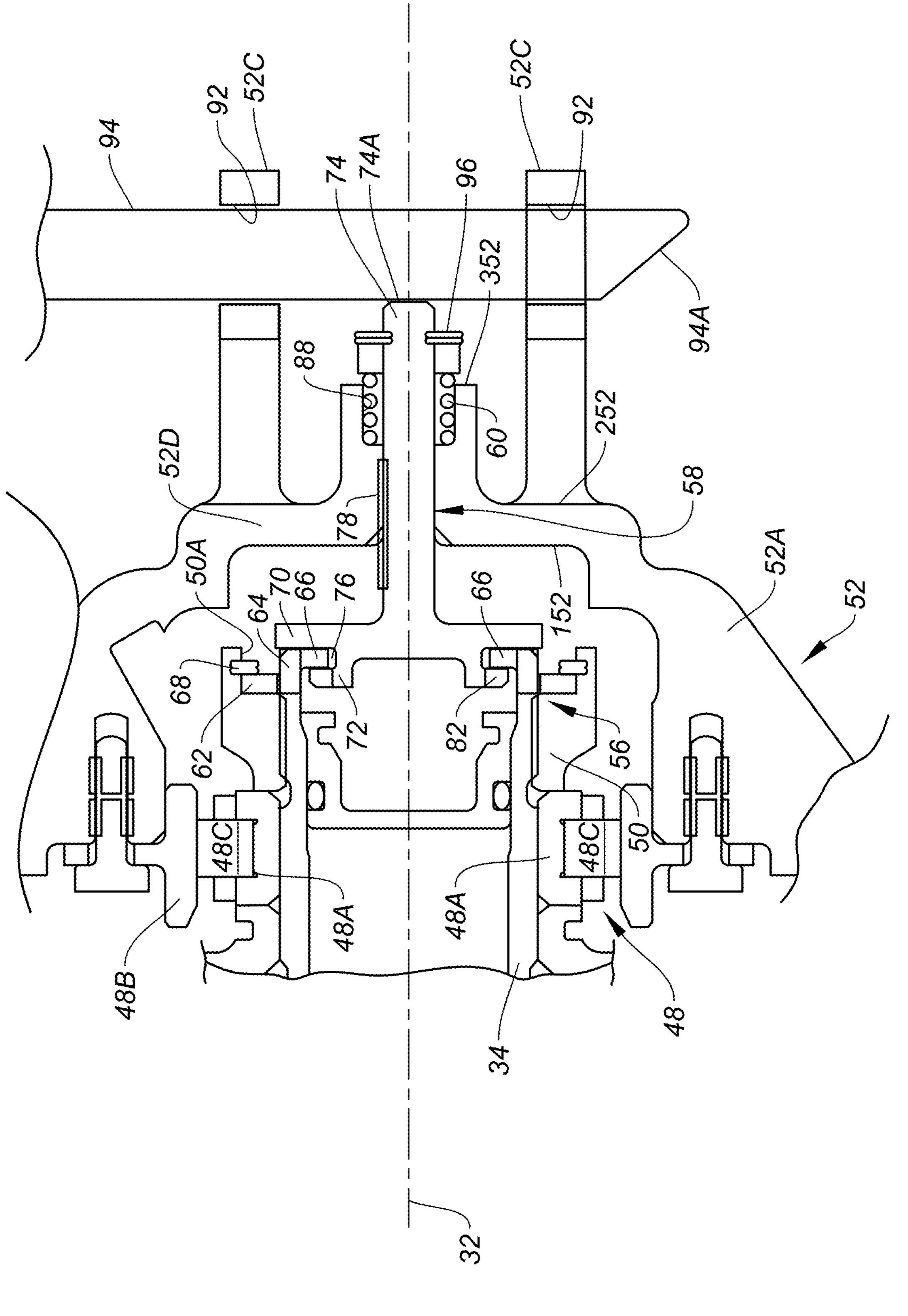
FIG. 7 is the diagrammatic view shown in FIG. 6, now with the present disclosure shaft retention system disposed in an engaged configuration and the actuating tool embodiment fully engaged.
Figure 8:
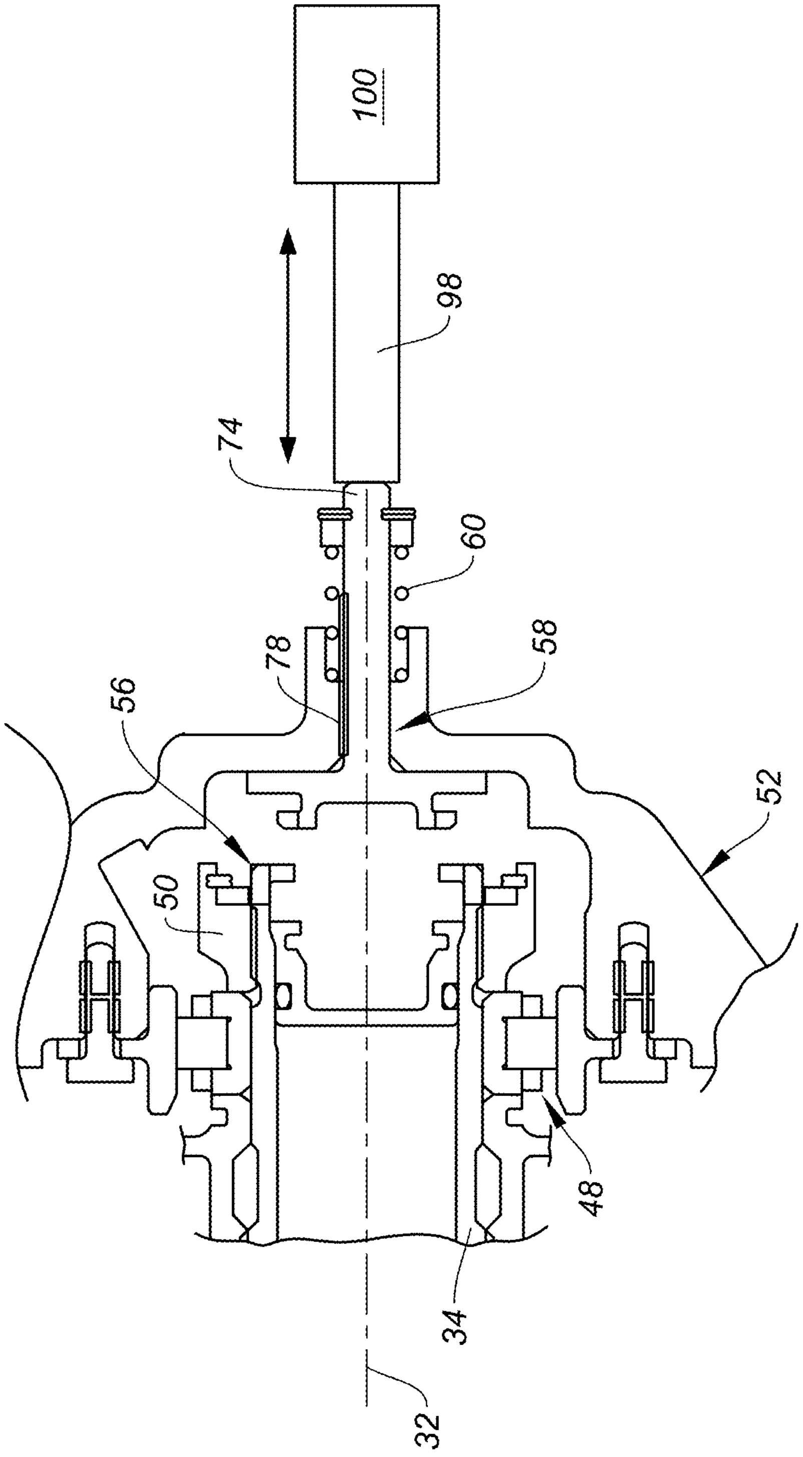
FIG. 8 is a diagrammatic enlarged view of a portion of the engine at the aft end of a low pressure shaft of a gas turbine engine, illustrating an embodiment of the present disclosure shaft retention system disposed in a disengaged configuration and including an actuating tool embodiment partially engaged.
Figure 9:
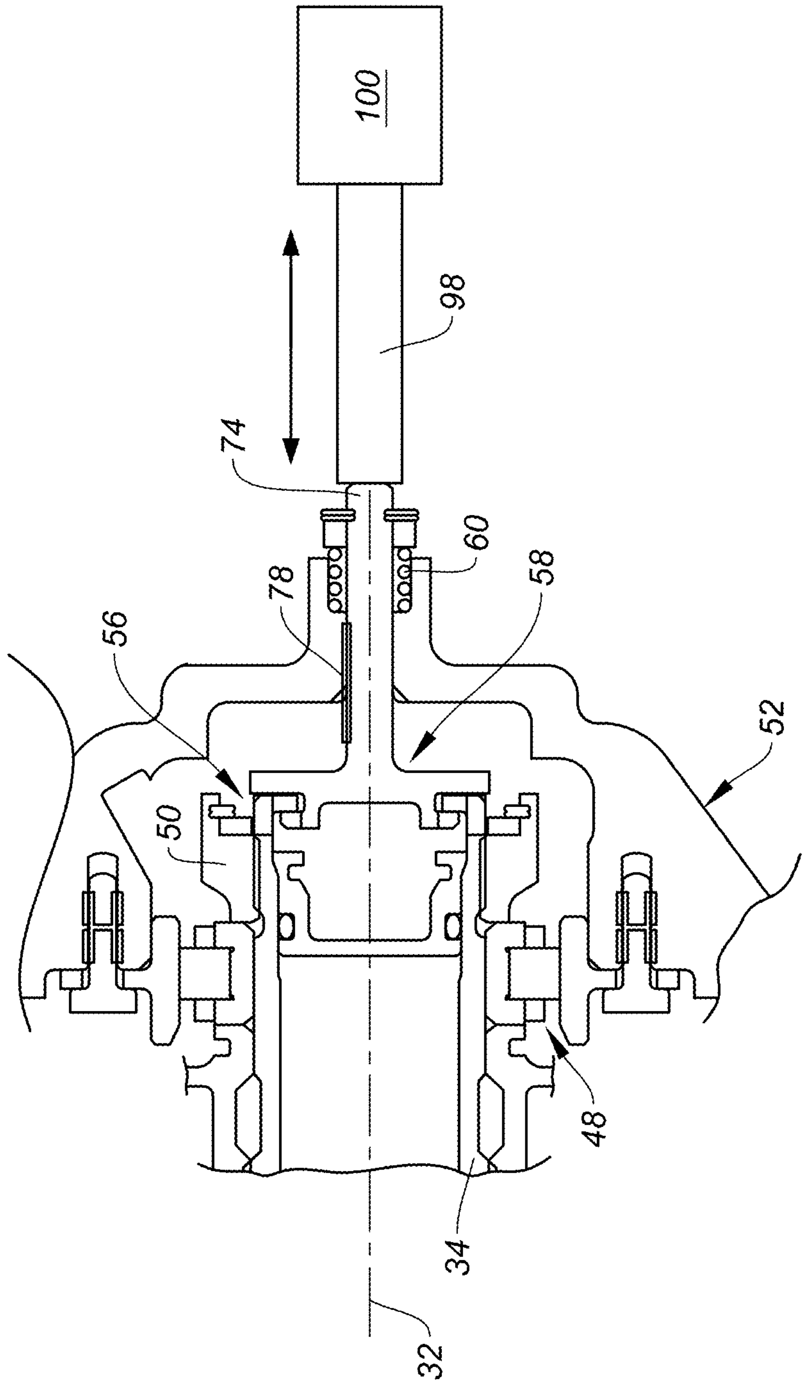
FIG. 9 is the diagrammatic view shown in FIG. 8, now with the present disclosure shaft retention system disposed in an engaged configuration and the actuating tool embodiment fully engaged.

FIGS. 8 and 9 illustrate another non-limiting example that utilizes the same retainer piston 58, shaft retainer cap 56, and piston spring 60 arrangement shown in FIGS. 6 and 7. In this embodiment, the bearing housing 52 does not include a tool post 52C and does not utilize an actuating tool 94 like that diagrammatically shown in FIGS. 6 and 7. In place thereof, this embodiment utilizes a pushrod 98 and an actuator 100. The pushrod 98 is axially aligned and in contact with the retainer piston 58. The actuator 100 is configured to axially translate the pushrod 98 to actuate the shaft retention system 54 from the disengaged configuration to the engaged configuration.

Figure 10:
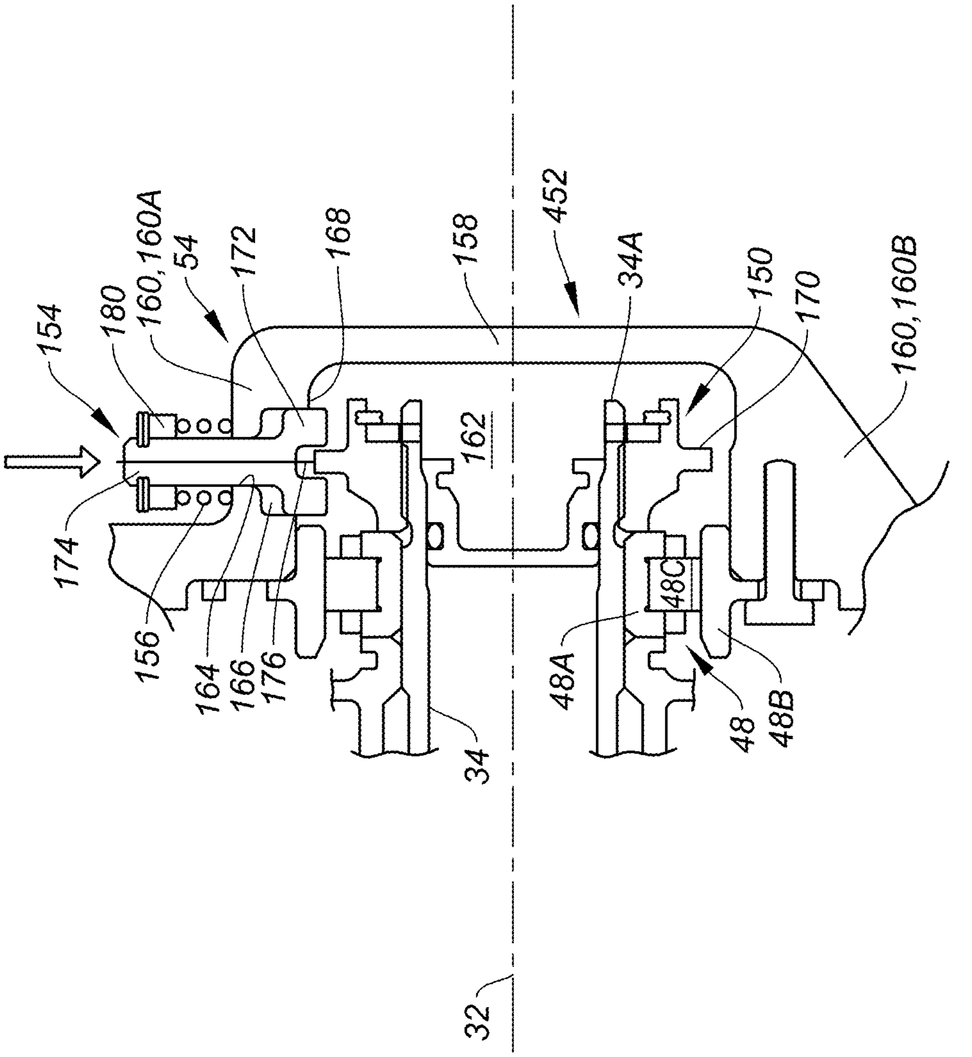
FIG. 10 is a diagrammatic enlarged view of a portion of the engine at the aft end of a low pressure shaft of a gas turbine engine, illustrating an embodiment of the present disclosure shaft retention system disposed in an engaged configuration.

FIG. 10 illustrates another shaft retention system 54 embodiment. FIG. 10 illustrates the aft end 34A of the low pressure shaft 34, a bearing 48, and the shaft retention system 54. The bearing 48 is disposed to rotationally support the low pressure shaft 34. The bearing 48 includes an inner race 48A, an outer race 48B, and roller elements 48C. A shaft nut 150 (detailed herein) is engaged with inner race 48A of the bearing 48 and the low pressure shaft 34 to axially secure the bearing 48 relative to the low pressure shaft 34.

Figure 13:
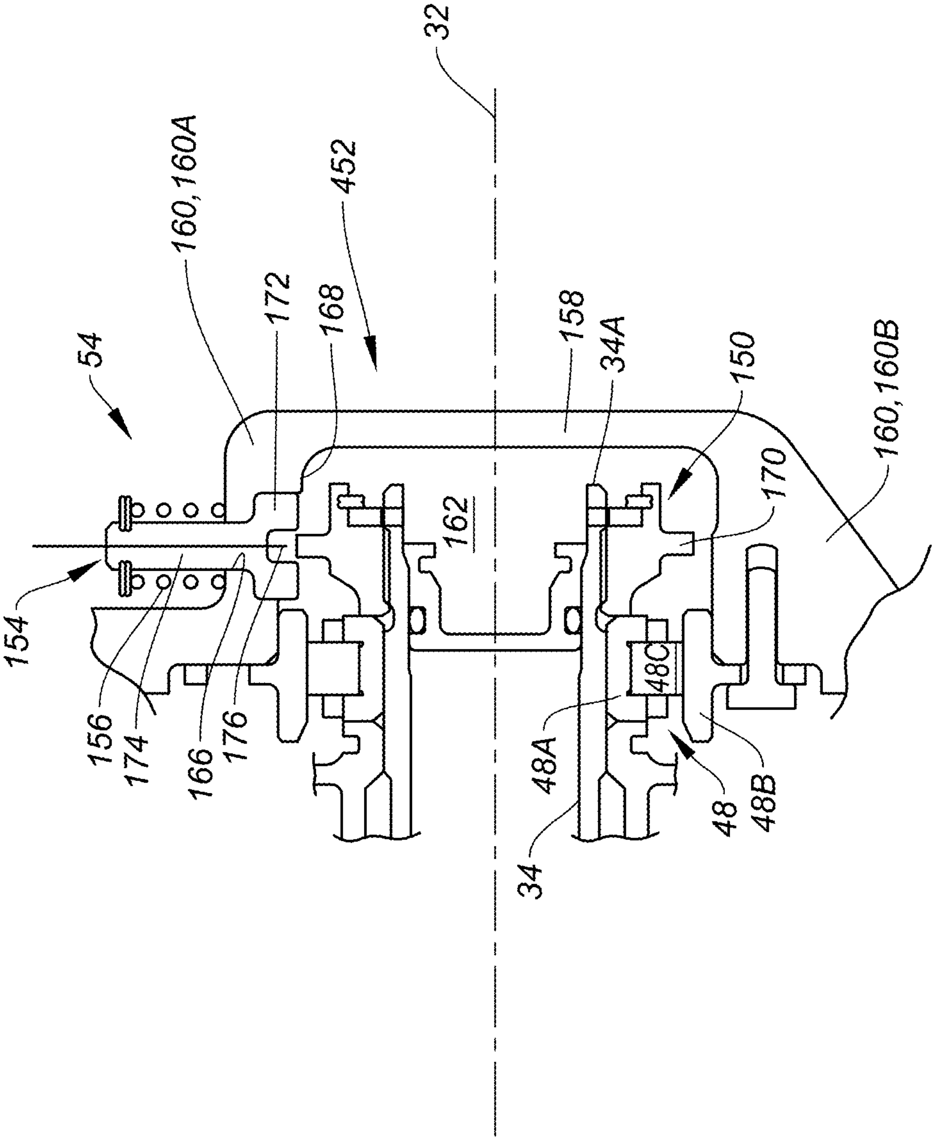
FIG. 13 is a diagrammatic enlarged view of a portion of the engine at the aft end of a low pressure shaft of a gas turbine engine, illustrating an embodiment of the present disclosure shaft retention system disposed in a disengaged configuration.

The shaft retention system 54 embodiment shown in FIG. 10 includes a bearing housing 452, the shaft nut 150, a shaft retainer 154, and a shaft retainer spring 156. The bearing housing 452 includes an end wall 158 and a side wall 160. The side wall 160 extends axially outward from the end wall 158 and together the end wall 158 and the side wall 160 define an interior cavity 162 of the bearing housing 452. When assembled (as shown in FIGS. 10 and 13), the aft end 34A of the low pressure shaft 34 and the shaft nut 150 are disposed within the interior cavity 162. The distal end of the side wall 160 is engaged with the outer race 48B of the bearing 48. To facilitate the description herein, the bearing housing side wall 160 is described as having a first side wall segment 160A and a second side wall segment 160B. The first side wall segment 160A and the second side wall segment 160B are disposed opposite one another; e.g., diametrically opposite. The first side wall segment 160A includes an aperture 164 extending through the first side wall segment 160A. The aperture 164 is configured to receive a portion of the shaft retainer 154; e.g., the post 174. In some embodiments (e.g., as shown in FIGS. 10 and 13), the first side wall segment 160A may include a slot 166 disposed in an inner radial surface 168 of the first side wall segment 160A. As can be seen in FIGS. 10 and 13, the aperture 164 is aligned with the slot 166.

In the shaft retention system 54 embodiment shown in FIG. 10, the shaft nut 150 is configured for mechanical engagement with the low pressure shaft 34 (e.g., a threaded engagement) and is also configured for engagement with shaft retainer 154. As can be seen in FIG. 10, the shaft nut 150 may include a flange 170 that extends radially outward from the perimeter of the shaft nut 150; e.g., in a direction that is perpendicular to the axial centerline 32 of the shaft nut 150. In some embodiments, the post 174 or the engagement segment 172 of the shaft retainer 154 may include an axisymmetric feature (e.g., a key—not shown) that mates with a feature (e.g., a slot—not shown) disposed in the first side wall segment 160A to prevent rotation of the shaft retainer 154 relative to the first side wall segment 160A.

Figure 11:
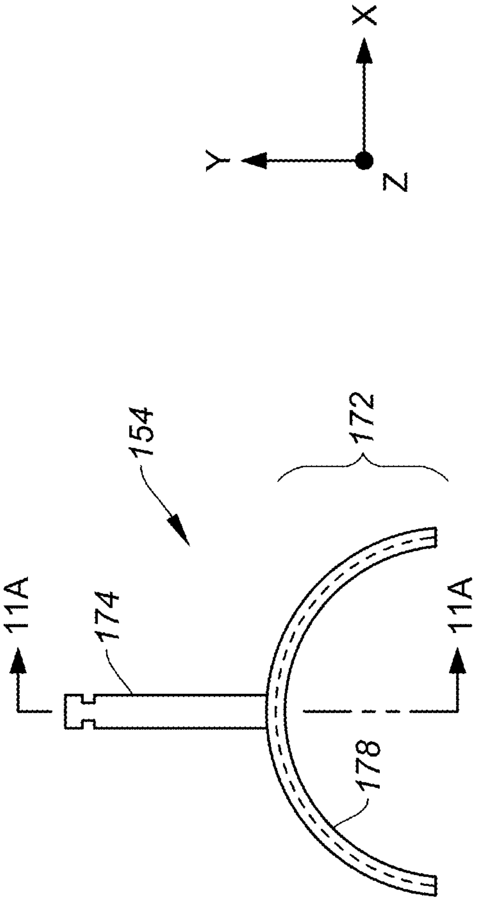
FIG. 11 is a diagrammatic side view of a shaft retainer embodiment.
Figure 11A:
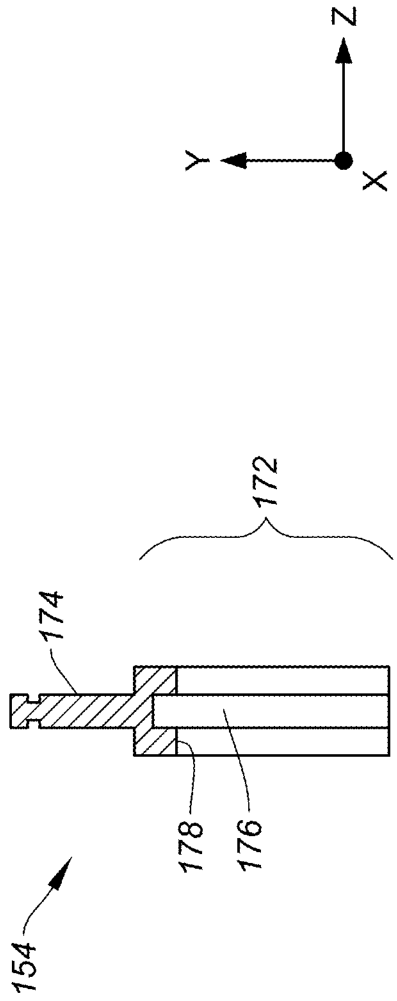
FIG. 11A is a diagrammatic sectional view of the shaft retainer embodiment shown in FIG. 11 sectioned along line 11A-11A.
Figure 12:
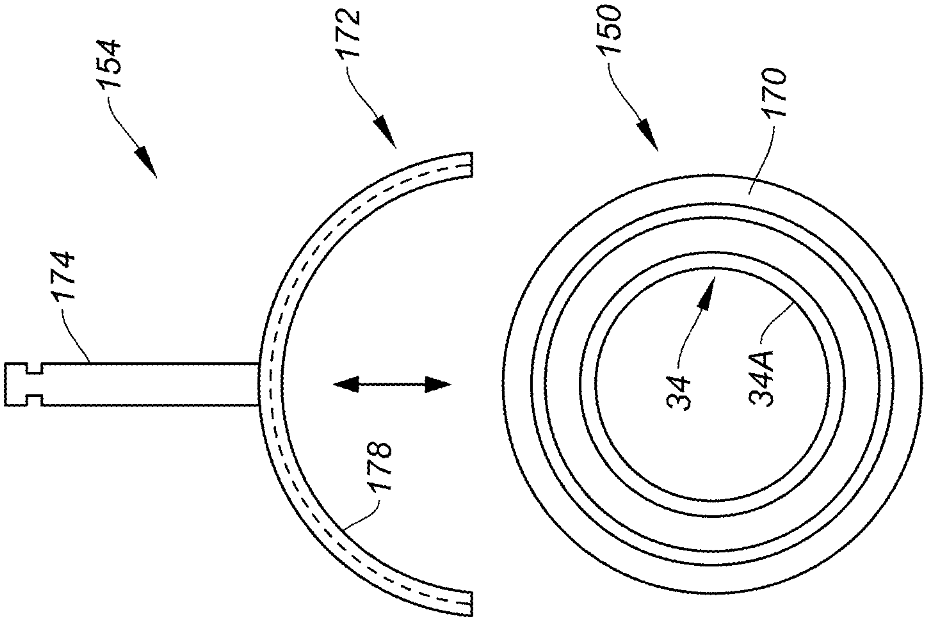
FIG. 12 is a diagrammatic view of a shaft retainer relative to a shaft nut.

Referring to FIGS. 11 and 11A, the shaft retainer 154 includes an engagement segment 172 and a post 174 that extends outwardly from the engagement segment 172. In the embodiment shown in FIG. 11, the engagement segment 172 extends along a circular path (e.g., disposed at a radius) and has a generally rectangular cross-sectional geometry; i.e., in the Y-Z plane; see FIG. 11A. The circularity of the engagement segment 172 is chosen to enable the engagement segment 172 to mate with the flange 170 that extends outwardly from the shaft nut 150; e.g., see FIG. 12. A slot 176 is disposed in the inner radial surface 178 (see FIG. 11A) of the engagement segment 172. The slot 176 is configured to receive the flange 170 that extends outwardly from the shaft nut 150.

As detailed herein, the shaft retainer 154 and the flange 170 extending radially outward from the shaft nut 150 form a mating male and female couple wherein the female half is disposed within the engagement segment 172 of the shaft retainer 154. The present disclosure is not limited to this particular configuration. For example, a mating male and female couple may include a female half disposed in the perimeter of the shaft nut 150 and the male half disposed with the engagement segment 172 of the shaft retainer 154.

Referring to FIGS. 10 and 13, when the shaft retention system 54 is in assembled form, the post 174 of the shaft retainer 154 extends through the aperture 164 disposed in the first side wall segment 160A. The shaft retainer spring 156 (e.g., a coil spring) acts between an exterior surface of the first side wall segment 160A and a washer 180 which is maintained on the post 174 by a retainer clip or ring. The shaft retainer 154 is disposable in an engaged configuration wherein the shaft retainer 154 is engaged with the flange 170 extending outward from the shaft nut 150 (see FIG. 10) and in a disengaged configuration wherein the shaft retainer 154 is not engaged with the flange 170 extending outward from the shaft nut 150 (see FIG. 13).

In the normal disengaged configuration (e.g., see FIG. 10A), the engagement segment 172 of the shaft retainer 154 may be received within the slot 166 disposed in the inner radial surface 168 of the first side wall segment 160A. In this configuration, the low pressure shaft 34 is not axially retained. To axially secure the low pressure shaft 34, the shaft retainer 154 is translated from the normal disengaged configuration to the engaged configuration by linearly translating the post 174 of the shaft retainer 154 radially inward. The linear translation of the shaft retainer 154 may be accomplished by a tool (e.g., a push rod) that is inserted through the engine casing and into engagement with the post 174 of the shaft retainer 154. The linear translation of the post 174 causes the shaft retainer spring 156 to compress and resist the linear translation. Continued linear translation of the post 174 will cause the engagement segment 172 of the shaft retainer 154 to be disposed in close proximity to or in contact with the shaft nut 150. The proximity of the engagement segment 172 to the shaft nut 150 is such that the flange 170 extending outward from the shaft nut 150 is received within the slot 176 disposed in the inner radial surface 178 of the engagement segment 172. Once the flange 170 of the shaft nut 150 is received within the slot 176 of the engagement segment 172, the shaft retainer 154 is disposed in the engaged configuration and the low pressure shaft 34 is axially secured. To shift the shaft retainer 154 from the engaged configuration back to the normal disengaged configuration, the tool is removed from the post 174 of the shaft retainer 154. Once the tool is removed, the shaft retainer spring 156 will expand and cause the shaft retainer 154 to translate outwardly back to the disengaged configuration.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted is a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A gas turbine engine having an axial centerline, comprising:
- a compressor section;
- a combustor;
- a turbine section;
- an engine shaft engaged with the compressor section and the turbine section, the engine shaft having an aft end, wherein the engine shaft axially extends along the axial centerline of the engine; and
- a shaft retention system that includes:
  - a shaft nut attached to the aft end of the engine shaft; and
  - a shaft retainer mounted for axial translation normal to the axial centerline;
- wherein the shaft retainer is disposable in an engaged configuration wherein the shaft retainer is coupled with the shaft nut, and in a disengaged configuration wherein the shaft retainer is disengaged with the shaft nut; and
- wherein the shaft retention system includes a shaft retainer spring that normally biases the shaft retainer in the disengaged configuration.

2. The gas turbine engine of claim 1, wherein the shaft retainer includes a first mechanical feature and the shaft nut includes a second mechanical feature and in the engaged configuration the first mechanical feature and the second mechanical feature are disposed in a mating configuration that axially secures the engine shaft.

3. The gas turbine engine of claim 2, wherein the shaft retainer includes a post extending outwardly from an engagement segment, and the first mechanical feature is disposed in the engagement segment.

4. The gas turbine engine of claim 3, wherein the first mechanical feature is a slot disposed in the engagement segment.

5. The gas turbine engine of claim 4, wherein the engagement segment (ES) is curved at a radius and has an ES inner radial surface and the slot is disposed in the ES inner radial surface.

6. The gas turbine engine of claim 5, wherein the second mechanical feature is a flange that extends radially outward from an outer perimeter surface of the shaft nut, and the flange is configured to be received within the slot.

7. The gas turbine engine of claim 6, wherein the shaft retention system includes a bearing housing configured to support the shaft retainer.

8. The gas turbine engine of claim 7, wherein the bearing housing includes an end wall and a side wall, wherein the end wall and the side wall collectively define an interior cavity of the bearing housing.

9. The gas turbine engine of claim 8, wherein the side wall has a first side wall segment that includes an aperture configured to receive the post of the shaft retainer.

10. The gas turbine engine of claim 9, wherein the shaft nut is disposed within the interior cavity of the bearing housing.

11. The gas turbine engine of claim 10, wherein the first side wall segment (FSWS) has an inner radial surface and a FSWS slot disposed in the inner radial surface, and wherein the aperture is aligned with the FSWS slot.

12. The gas turbine engine of claim 11, wherein the FSWS slot is configured to receive the engagement segment of the shaft retainer.

13. The gas turbine engine of claim 12, wherein the shaft retainer is normally biased in the disengaged configuration.

14. The gas turbine engine of claim 9, wherein the shaft retainer spring is a coil spring that acts between the post of the shaft retainer and the first side wall segment.

15. The gas turbine engine of claim 1, wherein the shaft retention system includes a bearing housing having an end wall and a side wall, wherein the end wall and the side wall collectively define an interior cavity of the bearing housing.

16. The gas turbine engine of claim 15, wherein the shaft retainer includes a post extending outwardly from an engagement segment.

17. The gas turbine engine of claim 16, wherein the side wall has a first side wall segment that includes an aperture configured to receive the post of the shaft retainer, wherein the aperture is configured to allow axial translation of the post in a direction that is perpendicular to the axial centerline.

18. The gas turbine engine of claim 17, wherein the engagement segment (ES) is curved at a radius and has an ES inner radial surface and an ES slot disposed in the ES inner radial surface; and wherein the shaft nut includes a flange that extends radially outward from an outer perimeter surface of the shaft nut, and the flange is configured to be received within the ES slot.

19. The gas turbine engine of claim 18, wherein the first side wall segment (FSWS) has an inner radial surface and a FSWS slot disposed in the inner radial surface, and wherein the aperture is aligned with the FSWS slot; and wherein the FSWS slot is configured to receive the engagement segment of the shaft retainer.

20. A gas turbine engine having an axial centerline, comprising:

a compressor section;

a combustor;

a turbine section;

an engine shaft engaged with the compressor section and the turbine section, the engine shaft having an aft end, wherein the engine shaft axially extends along the axial centerline of the engine; and a shaft retention system that includes:

a shaft nut attached to the aft end of the engine shaft;

a shaft retainer mounted for axial translation normal to the axial centerline;

wherein the shaft retainer is disposable in an engaged configuration wherein the shaft retainer is coupled with the shaft nut, and in a disengaged configuration wherein the shaft retainer is disengaged with the shaft nut;

wherein the shaft retainer includes a first mechanical feature and the shaft nut includes a second mechanical feature and in the engaged configuration the first mechanical feature and the second mechanical feature are disposed in a mating configuration that axially secures the engine shaft;

wherein the shaft retainer includes a post extending outwardly from an engagement segment, and the first mechanical feature is disposed in the engagement segment;

wherein the first mechanical feature is a slot disposed in the engagement segment;

wherein the engagement segment (ES) is curved at a radius and has an ES inner radial surface and the slot is disposed in the ES inner radial surface;

wherein the second mechanical feature is a flange that extends radially outward from an outer perimeter surface of the shaft nut, and the flange is configured to be received within the slot;

wherein the shaft retention system includes a bearing housing configured to support the shaft retainer.

* * * * *